(12) United States Patent
Wu et al.

(10) Patent No.: US 9,832,478 B2
(45) Date of Patent: Nov. 28, 2017

(54) VIDEO ENCODING METHOD AND APPARATUS FOR DETERMINING SIZE OF PARALLEL MOTION ESTIMATION REGION BASED ON ENCODING RELATED INFORMATION AND RELATED VIDEO DECODING METHOD AND APPARATUS

(71) Applicant: MEDIATEK INC., Hsin-Chu (TW)

(72) Inventors: Tung-Hsing Wu, Chiayi (TW); Kun-Bin Lee, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 236 days.

(21) Appl. No.: 14/270,369

(22) Filed: May 6, 2014

(65) Prior Publication Data

US 2014/0341288 A1    Nov. 20, 2014

Related U.S. Application Data

(60) Provisional application No. 61/823,010, filed on May 14, 2013.

(51) Int. Cl.
*H04N 19/51* (2014.01)
*H04N 19/172* (2014.01)
(Continued)

(52) U.S. Cl.
CPC ........... *H04N 19/51* (2014.11); *H04N 19/109* (2014.11); *H04N 19/156* (2014.11); *H04N 19/157* (2014.11); *H04N 19/172* (2014.11); *H04N 19/177* (2014.11); *H04N 19/179* (2014.11); *H04N 19/436* (2014.11)

(58) Field of Classification Search
CPC ...................................................... H04N 19/51
See application file for complete search history.

(56) References Cited

U.S. PATENT DOCUMENTS

| 2002/0116595 A1* | 8/2002 | Morton ..................... G06F 8/45 712/22 |
| 2012/0257678 A1* | 10/2012 | Zhou ...................... H04N 19/52 375/240.16 |

(Continued)

FOREIGN PATENT DOCUMENTS

| CN | 101287126 A | 10/2008 |
| CN | 102172025 A | 8/2011 |

(Continued)

*Primary Examiner* — William C Vaughn, Jr.
*Assistant Examiner* — Joseph A Towe
(74) *Attorney, Agent, or Firm* — Winston Hsu

(57) ABSTRACT

One exemplary video encoding method has the following steps: determining a size of a parallel motion estimation region according to encoding related information; and encoding a plurality of pixels by at least performing motion estimation based on the size of the parallel motion estimation region. One exemplary video decoding method has the following steps: decoding a video parameter stream to obtain a decoded size of a parallel motion estimation region; checking validity of the decoded size of the parallel motion estimation region, and accordingly generating a checking result; when the checking result indicates that the decoded size of the parallel motion estimation region is invalid, entering an error handling process to decide a size of the parallel motion estimation; and decoding a plurality of pixels by at least performing motion estimation based on the decided size of the parallel motion estimation region.

8 Claims, 7 Drawing Sheets

(51) Int. Cl.
*H04N 19/109* (2014.01)
*H04N 19/156* (2014.01)
*H04N 19/157* (2014.01)
*H04N 19/177* (2014.01)
*H04N 19/179* (2014.01)
*H04N 19/436* (2014.01)

(56) References Cited

U.S. PATENT DOCUMENTS

| | | | |
|---|---|---|---|
| 2013/0128978 A1* | 5/2013 | Yie | H04N 19/176 375/240.16 |
| 2013/0195189 A1* | 8/2013 | Seregin | H04N 19/00587 375/240.16 |
| 2013/0208799 A1* | 8/2013 | Srinivasamurthy | H04N 19/119 375/240.16 |
| 2014/0226719 A1* | 8/2014 | Yamamoto | H04N 19/0006 375/240.12 |
| 2014/0301461 A1* | 10/2014 | Jeon | H04N 19/00678 375/240.12 |
| 2015/0205987 A1* | 7/2015 | Lu | G06K 7/10366 340/10.1 |
| 2015/0312588 A1* | 10/2015 | Yamamoto | H04N 19/105 375/240.15 |

FOREIGN PATENT DOCUMENTS

| | | |
|---|---|---|
| CN | 102726048 A | 10/2012 |
| CN | 102880842 A | 1/2013 |
| CN | 103096073 A | 5/2013 |

\* cited by examiner

VIDEO ENCODING METHOD AND APPARATUS FOR DETERMINING SIZE OF PARALLEL MOTION ESTIMATION REGION BASED ON ENCODING RELATED INFORMATION AND RELATED VIDEO DECODING METHOD AND APPARATUS

CROSS REFERENCE TO RELATED APPLICATIONS

This application claims the benefit of U.S. provisional application No. 61/823,010, filed on May 14, 2013 and incorporated herein by reference.

BACKGROUND

The disclosed embodiments of the present invention relate to video data processing, and more particularly, to a video encoding method and apparatus for determining a size of a parallel motion estimation region based on encoding related information and related video decoding method and apparatus.

Video compression, i.e., video encoding, is an essential technique for digital video storage and transmission. In general, video compression/encoding includes applying at least prediction, transform, quantization and entropy coding to sequential blocks of pixels in a video sequence to compress/encode the video sequence. The video decompression, i.e., video decoding, generally performs the inverse of these operations used in video compression/encoding to decompress/decode a compressed/encoded video sequence.

High efficiency video coding (HEVC) is one coding standard proposed to have improvement in coding efficiency over other coding standard such as H.264, as well as larger resolutions and higher frame rates. Several coding efficiency enhancement tools are proposed in HEVC standard. For example, a merge mode is designed to reduce coding overhead by allowing an inter-predicted prediction unit (PU) to inherit motion data, i.e., motion vectors, prediction direction and reference picture indices, from a position selected from spatial motion data positions in the same picture and temporal motion data positions derived based on a co-located PU in a reference picture. It is denoted as merge mode since it forms a merged region sharing all motion information. However, these spatial motion data positions are in other PUs. As a result, this dependency on motion data from positions in other PUs creates difficulty for parallel motion estimation in the video encoder.

To achieve parallel motion estimation, one largest coding unit (LCU) is divided in one or more non-overlapping parallel motion estimation regions of equal size. The non-overlapping parallel motion estimation region is also called parallel merge level in HEVC standard. From one parallel motion estimation region to another parallel motion estimation region, the motion estimation is sequentially performed. That is, motion estimation is performed on the next parallel motion estimation region after the motion estimation on the current parallel motion estimation region is completed. However, within one parallel motion estimation region, motion estimation for merge mode is performed in parallel for all of the PUs in the same parallel motion estimation region. More specifically, within a parallel motion estimation region, there is no dependency between the motion vectors of neighboring blocks in the same parallel motion estimation region when deriving motion vectors of merge mode. In this way, the derivation of motion vectors of merge mode in a parallel motion estimation region only uses motion vectors outside the parallel motion estimation region.

In a conventional design, the size of the parallel motion estimation region is set by an encoder configuration before the encoding process is started. Therefore, the fixed size of the parallel motion estimation region is used for encoding frames in a video sequence, which lacks flexibility in video encoding and fails to achieve an optimum parallel degree of encoding for different encoding applications.

SUMMARY

In accordance with exemplary embodiments of the present invention, a video encoding method and apparatus for determining a size of a parallel motion estimation region based on encoding related information and related video decoding method and apparatus are proposed to solve the above-mentioned problem.

According to a first aspect of the present invention, an exemplary video encoding method is disclosed. The exemplary video encoding method includes: determining a size of a parallel motion estimation region according to encoding related information; and encoding a plurality of pixels by at least performing motion estimation based on the size of the parallel motion estimation region.

According to a second aspect of the present invention, an exemplary video decoding method is disclosed. The exemplary video decoding method includes: decoding a video parameter stream to obtain a decoded size of a parallel motion estimation region; checking validity of the decoded size of the parallel motion estimation region, and accordingly generating a checking result; when the checking result indicates that the decoded size of the parallel motion estimation region is invalid, entering an error handling process to decide a size of the parallel motion estimation; and decoding a plurality of pixels by at least performing motion compensation based on the decided size of the parallel motion estimation region.

According to a third aspect of the present invention, an exemplary video encoding apparatus is disclosed. The exemplary video encoding apparatus includes an encoder parameter setting circuit and a video encoder. The encoder parameter setting circuit is arranged to determine a size of a parallel motion estimation region according to encoding related information. The video encoder is arranged to encode a plurality of pixels by at least performing motion estimation based on the size of the parallel motion estimation region.

According to a fourth aspect of the present invention, an exemplary video decoding apparatus includes an input interface and a video decoder. The input interface is arranged to receive an encoded video bitstream including a video parameter stream. The video decoder is arranged to decode the video parameter stream to obtain a decoded size of a parallel motion estimation region; check validity of the decoded size of the parallel motion estimation region, and accordingly generate a checking result; enter an error handling process to decide a size of the parallel motion estimation when the checking result indicates that the decoded size of the parallel motion estimation region is invalid; and decode a plurality of pixels of the encoded video bitstream by at least performing motion compensation based on the decided size of the parallel motion estimation region.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

One basic idea of the present invention is to set the size of the parallel motion estimation region based on encoding related information. That is, the size of the parallel motion estimation region may not be fixed during the video encoding/compression process. In this way, concerning different encoding applications, the video encoding is more flexible, and has better parallel degree. Besides, high parallelism in software/hardware implementation of video encoding can be achieved.

Figure 1:
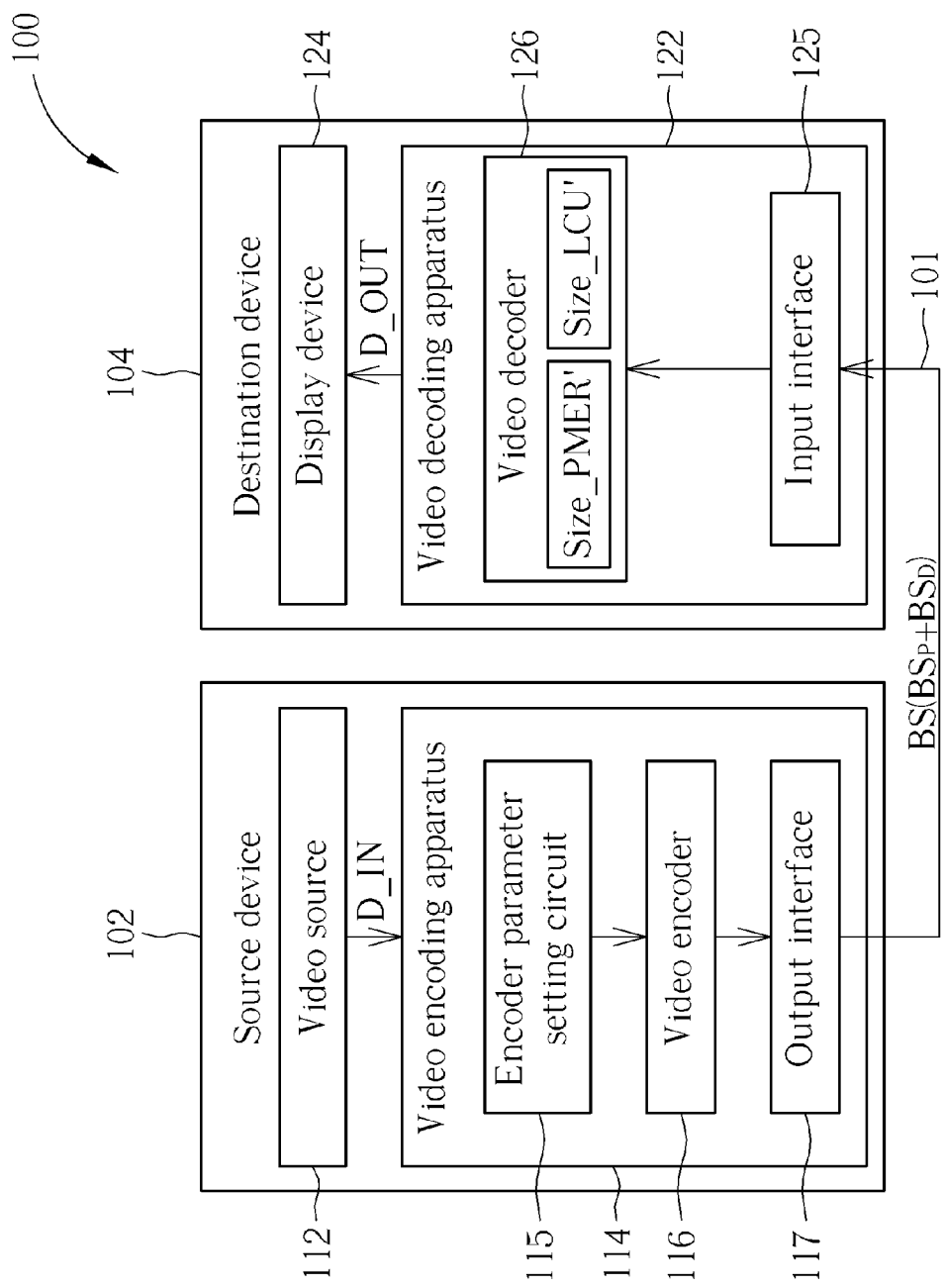
FIG. 1 is a block diagram illustrating a system employing the proposed video encoding and decoding techniques according to an embodiment of the present invention.

FIG. 1 is a block diagram illustrating a system employing the proposed video encoding and decoding techniques according to an embodiment of the present invention. The system 100 includes a source device 102 and a destination device 104. The source device 102 is responsible for providing encoded video data and associated video parameters to be decoded at a later time by the destination device 104. In particular, the source device 102 provides the encoded video data and associated video parameters to the destination device 104 via any transmission means 101. For example, the transmission means 101 may be a storage medium, a connection cable, or a wired/wireless network. The source device 102 and the destination device 104 may be any of a variety of electronic devices, including a computer, a smart phone, a set-top box, a television, a multimedia server, a multimedia client, etc.

As shown in FIG. 1, the source device 102 includes a video source 112 and a video encoding apparatus 114. The video source 112 provides a source video input D_IN to be encoded by the video encoding apparatus 114 into an encoded video bitstream BS. For example, the video source 112 may be a video camera used to generate the source video input D_IN, or a video interface used to receive the source video input D_IN from a video content provider. The video encoding apparatus 114 encodes pixels in the source video input D_IN to generate the encoded video bitstream BS, including a video parameter stream $BS_P$ and a video payload data stream $BS_D$. Regarding the destination device 104, it includes a video decoding apparatus 122 and a display device 124. The video decoding apparatus 122 at the receiving end decodes the video parameter stream $BS_P$ to obtain encoder parameters used for encoding the source video input D_IN at the transmitting end, and then decodes pixels in the video payload data stream $BS_D$ based on the decoded encoder parameters to generate a reconstructed video output D_OUT to the display device 124 for video playback. By way of example, but not limitation, the video encoding apparatus 114 and the video decoding apparatus 122 may operate according to a video coding standard, such as the HEVC standard presently under development. Besides, the proposed video encoding and decoding techniques are applied to the video encoding apparatus 114 and the video decoding apparatus 122 to enhance the parallel motion compensation supported by HEVC standard. Further details of the proposed video encoding and decoding techniques are described as below.

Figure 2:
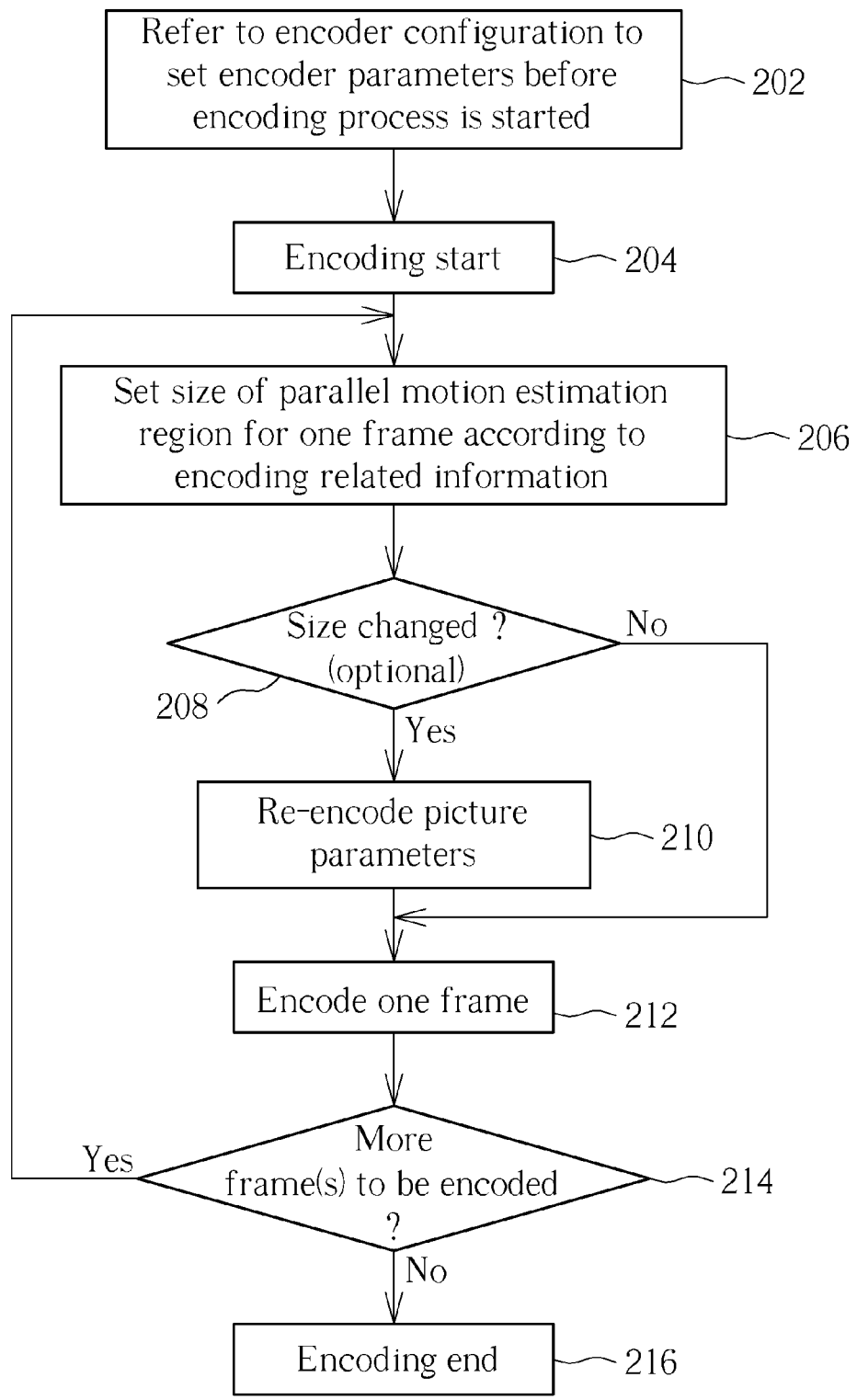
FIG. 2 is a flowchart illustrating a first video encoding method according to an embodiment of the present invention.

Please refer to FIG. 2 in conjunction with FIG. 1. FIG. 2 is a flowchart illustrating a first video encoding method according to an embodiment of the present invention. The video encoding method in FIG. 2 may be employed by the video encoding apparatus 114 shown in FIG. 1. Provided that the result is substantially the same, the steps are not required to be executed in the exact order shown in FIG. 2. In step 202, the encoder parameter setting circuit 115 refers to an encoder configuration to set encoder parameters used by the video encoder 116 before the video encoder 116 starts the encoding process. It is noted that encoder parameter setting function can be realized via hardware-based or software-based implementation. In a case where the hardware-based implementation is employed, the encoder parameter setting circuit 115 may be realized using pure hardware. In another case where the software-based implementation is employed, the encoder parameter setting circuit 115 may be realized by a processor executing program codes. For example, like the conventional video encoder design, a size of a parallel motion estimation region may be initially set based on the encoder configuration before the encoding process applied to the source video input D_IN is started. In step 204, the video encoder 116 starts the encoding process of the source video input D_IN. In step 206, the encoder parameter setting circuit 115 is operative to determine and set the size of the parallel motion estimation region Size_PMER for one frame according to encoding related information. By way of example, but not limitation, the encoding related information may include an encoding type, information of an encoding application, and/or external system information.

In a case where the encoding type is considered by the encoder parameter setting circuit 115, the encoding type referenced for setting the size of the parallel motion estimation region Size_PMER may include at least one of a reference type (for example, the reference type indicates a current frame to be encoded is a reference frame or a non-reference frame), a slice type (for example, the slice type indicates a slice in a current frame to be encoded is an intra (I) slice, a predicted (P) slice or a bi-directional predicted (B) slice), a largest coding unit (LCU) size, and the number of processing cores of a dedicated video encoder (if the video encoder 116 is implemented using pure hardware to serve as a dedicated video encoder, i.e., a hardware-based encoder). Exemplary settings of the size of the parallel motion estimation region Size_PMER under different encoding types are listed in Table 1 as below.

TABLE 1

| Encoding type | | Size of parallel motion estimation region |
|---|---|---|
| Reference frame | | 8 × 8 |
| Non-reference frame | | 32 × 32 |
| P slice | | 8 × 8 |
| B slice | | 16 × 16 |
| LCU size | 8 × 8 | 8 × 8 |
| | 16 × 16 | 16 × 16 |
| | 32 × 32 | 32 × 32 |
| | 64 × 64 | 64 × 64 |
| Number of internal processing cores | 1 | 8 × 8 |
| | 2 | 16 × 16 |
| | 4 | 32 × 32 |

In a case where information of the encoding application is considered by the encoder parameter setting circuit 115, the information of the encoding application may include at least one of a performance mode (for example, the performance mode may indicate whether the encoding application is operated in a low-performance mode or a high-performance mode), a latency mode (for example, the latency mode may indicate whether the encoding application is operated in a low-latency mode), and an encoding scenario (for example, the encoding scenario may indicate whether the encoding application is operated in a normal recording mode). Exemplary settings of the size of the parallel motion estimation region Size_PMER under different encoding applications are listed in Table 2 as below.

TABLE 2

| Encoding application | Size of parallel motion estimation region |
|---|---|
| Low-performance mode | 64 × 64 |
| Low-latency mode | 32 × 32 |
| Normal recording mode | 16 × 16 |
| High-performance mode | 8 × 8 |

In a case where the external system information is considered by the encoder parameter setting circuit 115, the external system information may include at least one of a bandwidth status (for example, the bandwidth status may indicate the system bandwidth such as the main memory bandwidth, or the network bandwidth), a system power status (which may indicate the remaining battery capacity), a system timing (which may indicate that the system has long latency or small latency), and the number of processing cores of a general purpose processor (if the video encoder 116 is implemented using a general purpose processor executing the encoding software, i.e., a software-based encoder). Exemplary settings of the size of the parallel motion estimation region Size_PMER under different external system information are listed in Table 3 as below.

TABLE 3

| External system information | | Size of parallel motion estimation region |
|---|---|---|
| High bandwidth mode | | 4 × 4 |
| Low bandwidth mode | | 32 × 32 |
| High remaining battery capacity | | 16 × 16 |
| Low remaining battery capacity | | 64 × 64 |
| Small latency | | 64 × 64 |
| Long latency | | 4 × 4 |
| Number of processing cores | 1 | 8 × 8 |
| | 2 | 16 × 16 |
| | 4 | 32 × 32 |

Generally speaking, the smaller is the size of the parallel motion estimation region, the processing time of motion estimation for one LCU is longer, and the power consumption is also larger. However, when the size of the parallel motion estimation region is set by a larger value, the video encoder is required to have higher computing power to achieve the desired parallel motion estimation, which results in a higher hardware cost inevitably. In one embodiment of the present invention, the size of the parallel motion estimation region can be adaptively set based on the encoding related information, including encoding type, information of the encoding application and/or external system information, thereby achieving optimum parallel motion estimation performance under limited system resources.

In step 208, the video encoder 116 checks if the size of the parallel motion estimation region Size_PMER decided for the current frame is different from the size of the parallel motion estimation region decided for a previous frame. If it is determined that the size of the parallel motion estimation region is changed, the video encoder 116 would re-encode the picture parameters to include the size of the parallel motion estimation region Size_PMER decided for the current frame (step 210). If step 208 finds that the size of the parallel motion estimation region is unchanged or step 210 finishes re-encoding the picture parameters, the video encoder 116 starts encoding a plurality of pixels in the current frame based on the size of the parallel motion estimation region Size_PMER set decided for the current frame (step 212). Hence, the video encoder 116 can perform parallel motion estimation upon PUs in the same parallel motion estimation region having the size set by the encoder parameter Size_PMER, thus leading to improved coding efficiency. In step 214, the video encoder 116 checks if all frames of the source video input D_IN have been encoded. If the source video input D_IN still has frame(s) waiting to be encoded, the flow proceeds with step 206. If the source video input D_IN has no frame waiting to be encoded, the video encoder 116 stops the encoding process (step 216).

It is noted that the step 208 is optional, depending upon actual design consideration. For example, in an alternative video encoder design, the step 208 and the related operations could be omitted, thus allowing step 210 to be executed immediately after step 206. In this way, after the encoder parameter setting circuit 115 sets the size of the parallel motion estimation region in the step 206, the video encoder 116 re-encodes the picture parameters in the step 210. In other words, the picture parameters are re-encoded each time the size of the parallel motion estimation region is set. This also falls within the scope of the present invention.

In above example shown in FIG. 2, the encoder parameter setting circuit 115 dynamically adjusts the size of the parallel motion estimation region Size_PMER at a frame level. However, this is for illustrative purposes only, and is not meant to be a limitation of the present invention. In an alternative design, the encoder parameter setting circuit 115 may adjust the size of the parallel motion estimation region Size_PMER at a sequence level.

Figure 3:
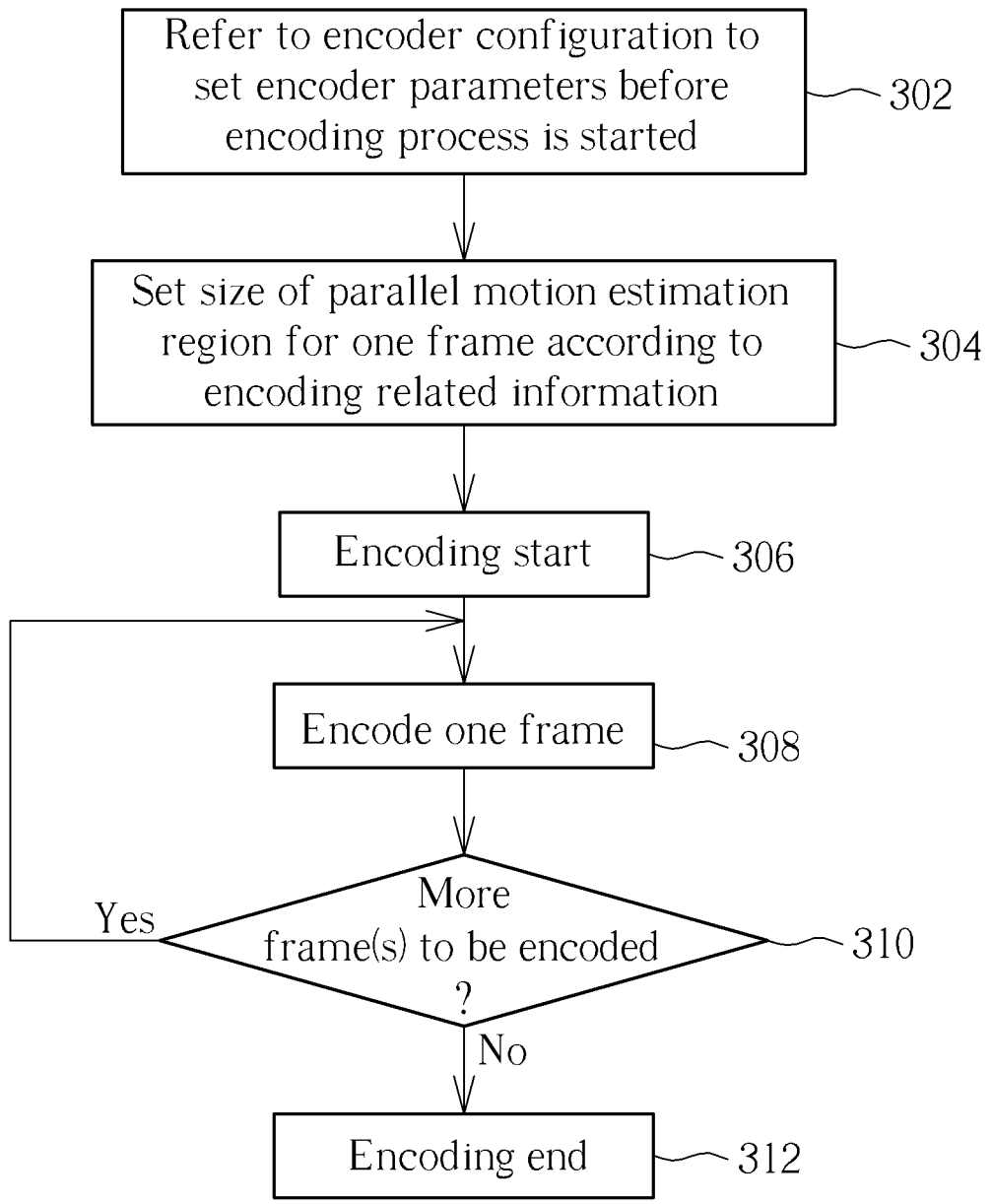
FIG. 3 is a flowchart illustrating a second video encoding method according to an embodiment of the present invention.

Please refer to FIG. 3 in conjunction with FIG. 1. FIG. 3 is a flowchart illustrating a second video encoding method according to an embodiment of the present invention. The video encoding method in FIG. 3 may be employed by the video encoding apparatus 114 shown in FIG. 1. Provided that the result is substantially the same, the steps are not required to be executed in the exact order shown in FIG. 3.

In step 302, the encoder parameter setting circuit 115 refers to an encoder configuration to set encoder parameters used by the video encoder 116 before the video encoder 116 starts the encoding process. For example, like the conventional video encoder design, a size of a parallel motion estimation region may be initially set based on the encoder configuration before the encoding process applied to the source video input D_IN is started. In step 304, the encoder parameter setting circuit 115 is operative to determine and set the size of the parallel motion estimation region Size_PMER for one video sequence (i.e., the source video input D_IN) according to encoding related information. As mentioned above, the encoding related information may include an encoding type, information of an encoding application, and/or external system information. In step 306, the video encoder 116 starts the encoding process of the source video input D_IN. In step 308, the video encoder 116 starts encoding a plurality of pixels in one frame based on the size of the parallel motion estimation region Size_PMER decided for the video sequence. Hence, the video encoder 116 can perform parallel motion estimation upon PUs in the same parallel motion estimation region having the size set by Size_PMER, thus improving the coding efficiency. In step 310, the video encoder 116 checks if all frames of the source video input D_IN have been encoded. If the source video input D_IN still has frame(s) waiting to be encoded, the flow proceeds with step 308 for using the same the size of the parallel motion estimation region Size_PMER to encode the next frame. If the source video input D_IN has no frame waiting to be encoded, the video encoder 116 stops the encoding process (step 312).

As mentioned above, the size of the parallel motion estimation region Size_PMER may depend on the LCU size. In accordance with the HEVC standard, one LCU contains one or more coding units (CUs), each CU contains one or more prediction units (PUs), and each CU can be either an intra coding unit or an inter coding unit. In a preferred embodiment of the present invention, the encoder parameter setting circuit 115 refers to the LCU size to make the size of the parallel motion estimation region equal to the LCU size. For the process of generating merge motion vector, it needs the motion vector of the neighboring blocks. Motion vector for one block is determined after the process of motion estimation. For example, in a case where the size of the parallel motion estimation region is not set by the LCU size, when a video encoder is encoding one LCU, the process of generating merge motion vector for CUs belonging to different parallel motion estimation regions in the LCU should be processed in a serial manner. That is, the process of generating merge motion vector for the next CU is performed after motion estimation for the current CU is completed. However, in another case where the size of the parallel motion estimation region is set by the LCU size as taught by the present invention, when a video encoder is encoding one LCU, the process of generating merge motion vector for CUs in the LCU can be processed in a parallel manner. That is, within the same LCU, the process of generating merge motion vector of one CU is independent of motion estimation of another CU. In this way, the parallel degree of video encoding is enhanced greatly.

An output of the video encoder 116 is transmitted to the destination device 104 though an output interface 117. For example, based on the standard of the transmission means 101, the output of the video encoder 116 is properly modulated/packed into the encoded video bitstream 101 by the output interface 117. It should be noted that the frame-level/sequence-level parallel motion estimation region size information used by the video encoder 116 is encoded into the video parameter stream $BS_P$ by the video encoder 116, and then transmitted to the destination device 104. With regard to the video decoding apparatus 122, it has an input interface 125 and a video decoder 126. The input interface 125 receives the encoded video bitstream BS from the transmission means 101. Similarly, based on the standard of the transmission means 101, the input interface 125 demodulates/unpacks the encoded video bitstream BS. Next, the video decoder 126 processes the video parameter stream $BS_P$ and the video payload data stream $BS_D$ to generate frames of the reconstructed video output D_OUT. The video decoder 126 may be a software-based encoder (i.e., a general purpose processor executing the decoding software) or a hardware-based encoder (i.e., a dedicated video decoder implemented using pure hardware).

Due to the use of the encoder parameter setting circuit 115, the size of the parallel motion estimation region Size_PMER is allowed to be adjusted based on the encoding related information. Besides, the size of the parallel motion estimation region Size_PMER is encoded into the video parameter stream $BS_P$ and transmitted to the video decoder 126. It is possible that the transmission means 101 is interfered with noise and introduces error bits into the encoded video bitstream BS during transmission. In this embodiment, the video decoder 126 is equipped with error handling capability when dealing with the size of the parallel motion estimation region.

Figure 4:
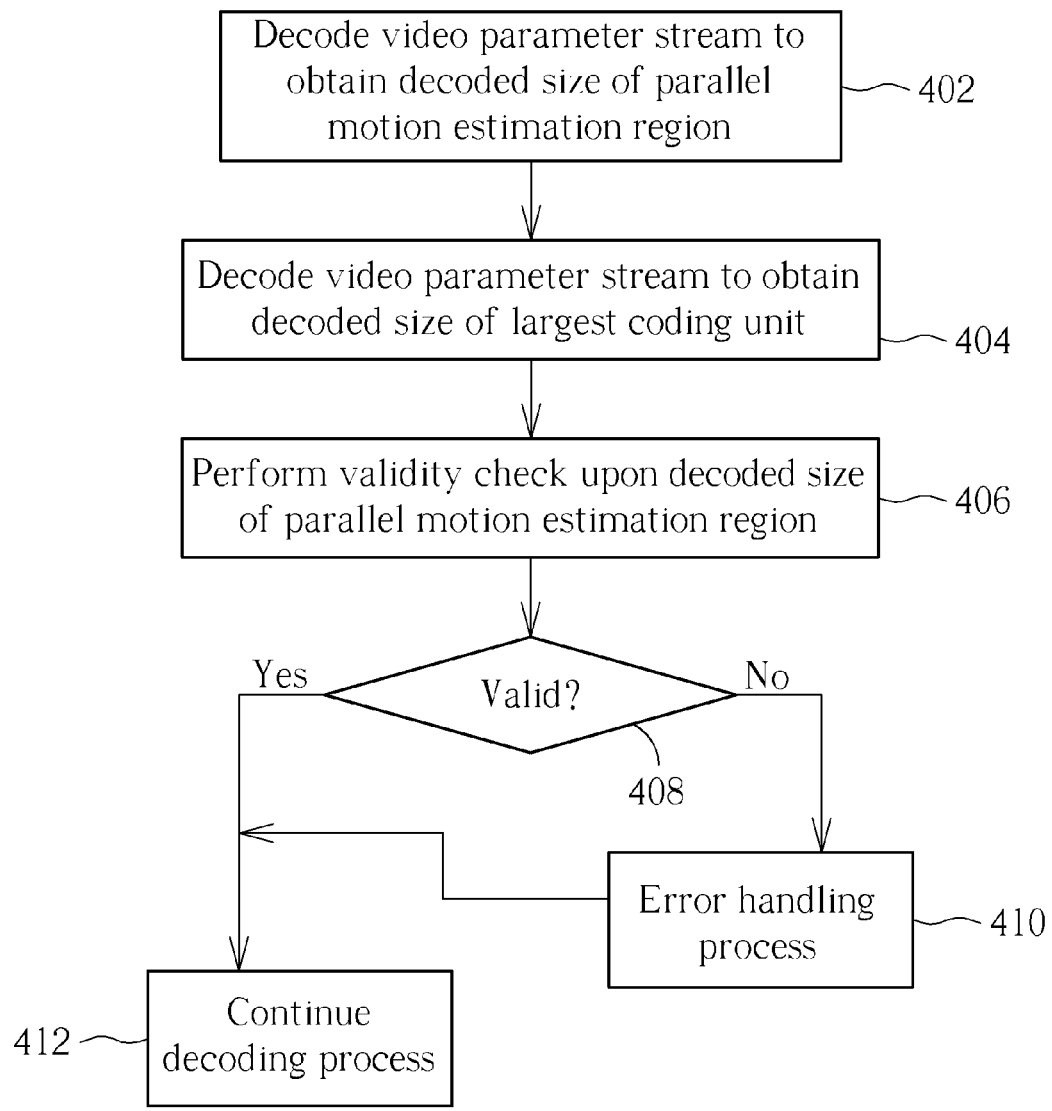
FIG. 4 is a flowchart illustrating a video decoding method with error handling according to an embodiment of the present invention.

Please refer to FIG. 4, which is a flowchart illustrating a video decoding method with error handling according to an embodiment of the present invention. The video decoding method in FIG. 4 may be employed by the video decoder 126 shown in FIG. 1. Provided that the result is substantially the same, the steps are not required to be executed in the exact order shown in FIG. 4.

In step 402, the video decoder 126 decodes the video parameter stream $BS_P$ to obtain a decoded size of a parallel motion estimation region Size_PMER'. In step 404, the video decoder 126 decodes the video parameter stream $BS_P$ to obtain a decoded size of a largest coding unit (LCU) Size_LCU'. For example, the video decoder 126 derives parameters, including a minimum coding unit size and a difference between a maximum coding unit size and the minimum coding unit size, from the video parameter stream $BS_P$, and then decides the decoded LCU size Size_LCU' based on these parameters. In step 406, the video decoder 126 checks validity of the decoded size of the parallel motion estimation region Size_PMER', and accordingly generating a checking result.

In one exemplary design, the video decoder 126 may compare the decoded size of the parallel motion estimation region Size_PMER' with the decoded LCU size Size_LCU' to examine the validity of the decoded size of the parallel motion estimation region Size_PMER'. For example, the decoded LCU size Size_LCU' is used to serve as an upper bound of a valid range, and a minimum PU size (e.g., 4×4) is used to serve as a lower bound of the valid range. When the decoded size of the parallel motion estimation region Size_PMER' falls within the valid range, the decoded size of the parallel motion estimation region Size_PMER' passes the validity test and is deemed valid. However, when the decoded size of the parallel motion estimation region Size_PMER' is beyond the valid range, the decoded size of the parallel motion estimation region Size_PMER' fails to pass the validity test and is deemed invalid. It should be noted that the above-mentioned valid range is for illustrative purpose only, and is not meant to be a limitation of the present invention. Alternatively, the upper bound of the valid range may be set by a fixed value (e.g., 64×64) or the minimum coding unit size.

In another exemplary design, the video decoder 126 obtains a parity check result associated with the decoded size of the parallel motion estimation region Size_PMER', and refers to the parity check result to examine the validity of the decoded size of the parallel motion estimation region Size_PMER'. For example, when the parity check result indicates that the decoded size of the parallel motion estimation region Size_PMER' is error-free, the decoded size of the parallel motion estimation region Size_PMER' passes the validity test and is deemed valid. However, when the parity check result indicates that the decoded size of the parallel motion estimation region Size_PMER' includes uncorrectable errors, the decoded size of the parallel motion estimation region Size_PMER' fails to pass the validity test and is deemed invalid.

In yet another exemplary design, both the comparison result and the parity check result are jointly considered to determine whether the decoded size of the parallel motion estimation region Size_PMER' is valid. For example, the decoded size of the parallel motion estimation region Size_PMER' is deemed valid only when the decoded size of the parallel motion estimation region Size_PMER' falls within the valid range and the parity check result indicates that the decoded size of the parallel motion estimation region Size_PMER' is error-free.

In a case where the decoded size of the parallel motion estimation region Size_PMER' is valid as indicated by the checking result (step 408), the video decoder 126 continues the decoding process to decode a plurality of pixels in the video payload data stream $BS_D$ by at least performing motion compensation based on the decoded size of the parallel motion estimation region Size_PMER' (step 412).

In another case where the decoded size of the parallel motion estimation region Size_PMER' is invalid as indicated by the checking result (step 408), the video decoder 126 enters an error handling process to decide a size of the parallel motion estimation that will be actually used in the following decoding process (step 410). Next, the video decoder 126 continues the decoding process to decode a plurality of pixels in the video payload data stream $BS_D$ by at least performing motion compensation based on the decided size of the parallel motion estimation region (step 412).

Figure 5:
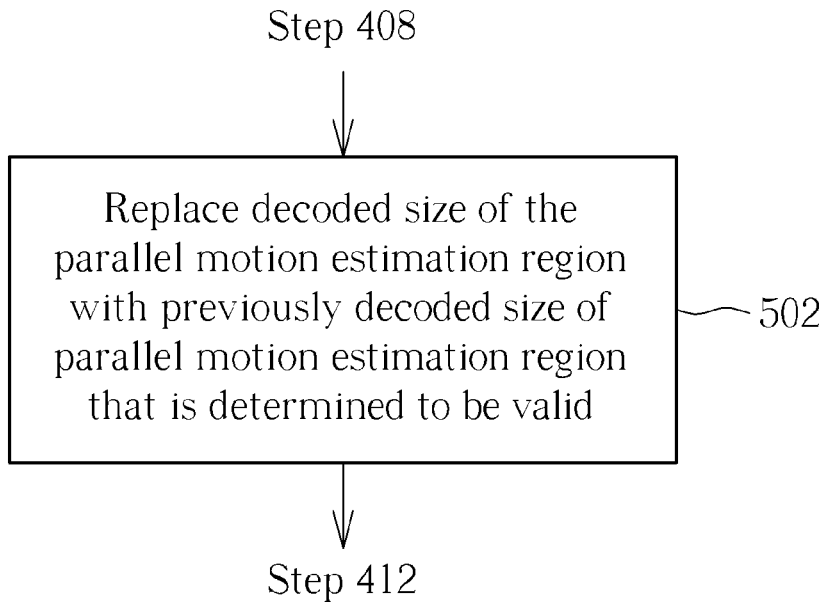
FIG. 5 is a flowchart illustrating a first error handling process according to an embodiment of the present invention.

The video decoder 126 may perform the error handling process by employing at least one of the proposed error handling schemes detailed hereinafter. Please refer to FIG. 5, which is a flowchart illustrating a first error handling process according to an embodiment of the present invention. Step 410 in FIG. 4 may be implemented using step 502 in FIG. 5. In accordance with the first error handling process, the video decoder 126 sets the decided size of the parallel motion estimation region used by the following decoding process by replacing the decoded size of the parallel motion estimation region Size_PMER' with a previously decoded size of a parallel motion estimation region that is determined to be valid (step 502). In other words, the size of the parallel motion estimation region used by the following decoding process is inherited from a valid parallel motion estimation region size that is decoded previously. In this way, no re-transmission of the video parameter stream is needed.

Figure 6:
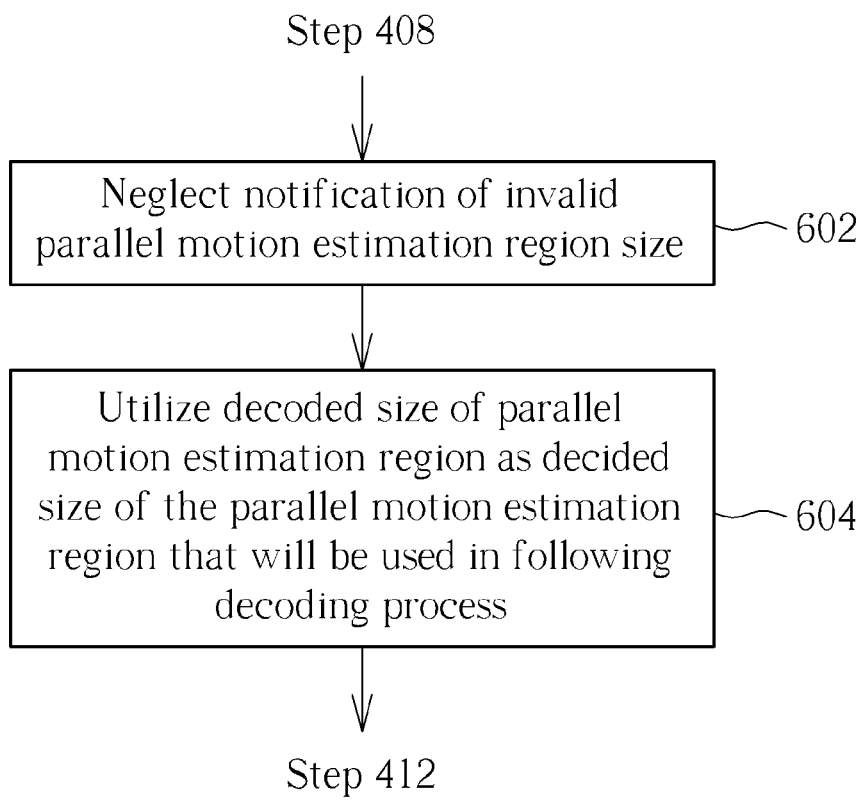
FIG. 6 is a flowchart illustrating a second error handling process according to an embodiment of the present invention.

Please refer to FIG. 6, which is a flowchart illustrating a second error handling process according to an embodiment of the present invention. Step 410 in FIG. 4 may be implemented using steps 602 and 604 in FIG. 6. For example, in accordance with the second error handling process, when the decoded size of the parallel motion estimation region Size_PMER' falls within a valid range but fails to pass the parity check (i.e., the associated parity check result indicates that the decoded size of the parallel motion estimation region Size_PMER' includes uncorrectable errors), the video decoder 126 ignores the checking result, i.e., neglects a notification of an invalid parallel motion estimation region size (step 602), and still utilizes the decoded size of the parallel motion estimation region Size_PMER' as the decided size of the parallel motion estimation region used in the following decoding process (step 604). Since the invalid parallel motion estimation region size falls within a valid range, the video decoder 126 may still have the chance of obtaining correct motion vectors for PUs in a parallel motion estimation region with a size set by Size_PMER'. In this way, no re-transmission of the video parameter stream is needed.

Figure 7:
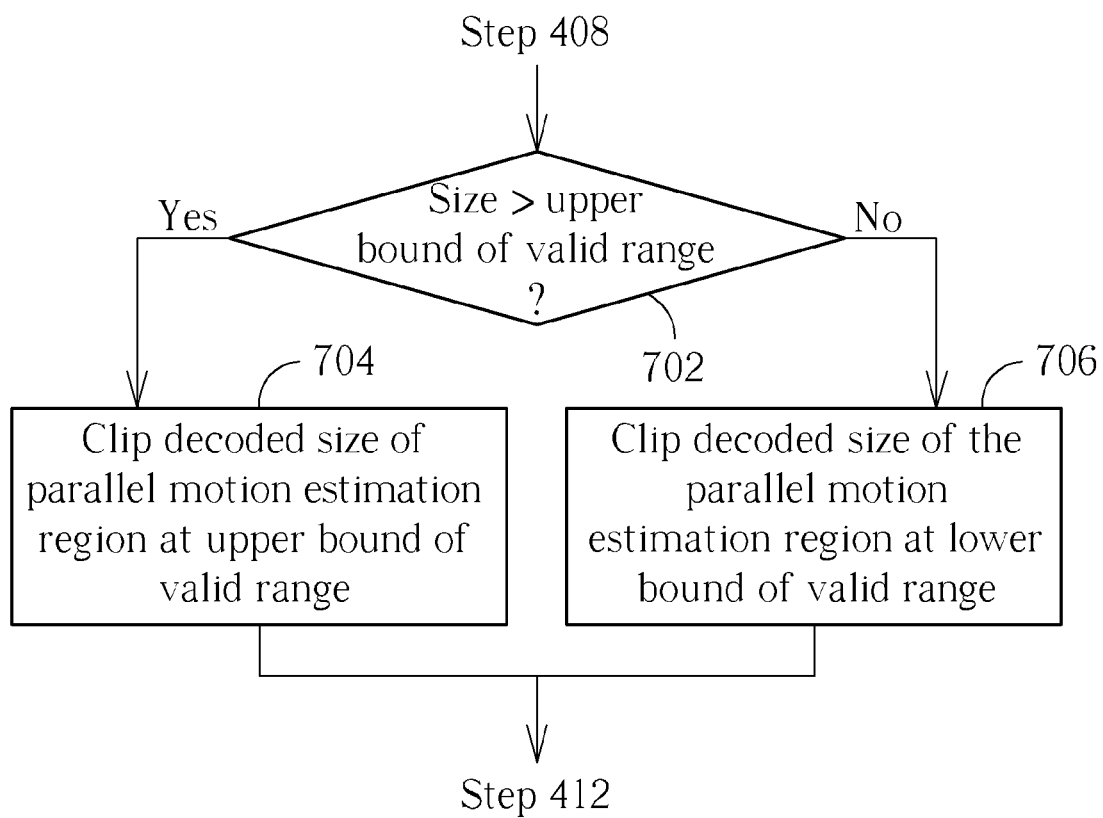
FIG. 7 is a flowchart illustrating a third error handling process according to an embodiment of the present invention.

Please refer to FIG. 7, which is a flowchart illustrating a third error handling process according to an embodiment of the present invention. Step 410 in FIG. 4 may be implemented using steps 702, 704 and 706 in FIG. 7. In accordance with the third error handling process, when the decoded size of the parallel motion estimation region Size_PMER' is beyond a valid range, the video decoder 126 checks if the decoded size of the parallel motion estimation region Size_PMER' is larger than an upper bound of the valid range such as an LCU size (step 702). When the decoded size of the parallel motion estimation region Size_PMER' is larger than the upper bound of the valid range, the video decoder 126 clips the decoded size of the parallel motion estimation region Size_PMER' at the upper bound of the valid range, i.e., sets the decided size of the parallel motion estimation region used in the following decoding process by the upper bound of the valid range (step 704). When the decoded size of the parallel motion estimation region Size_PMER' is not larger than the upper bound of the valid range, meaning that the decoded size of the parallel motion estimation region Size_PMER' is smaller than the lower bound of the valid range (e.g., the minimum PU size) due to the premise that the decoded size of the parallel motion estimation region Size_PMER' is beyond the valid range, the video decoder 126 clips the decoded size of the parallel motion estimation region Size_PMER' at the lower bound of the valid range, i.e., sets the decided size of the parallel motion estimation region used in the following decoding process by the lower bound of the valid range (step 706). In this way, no re-transmission of the video parameter stream is needed.

Figure 8:
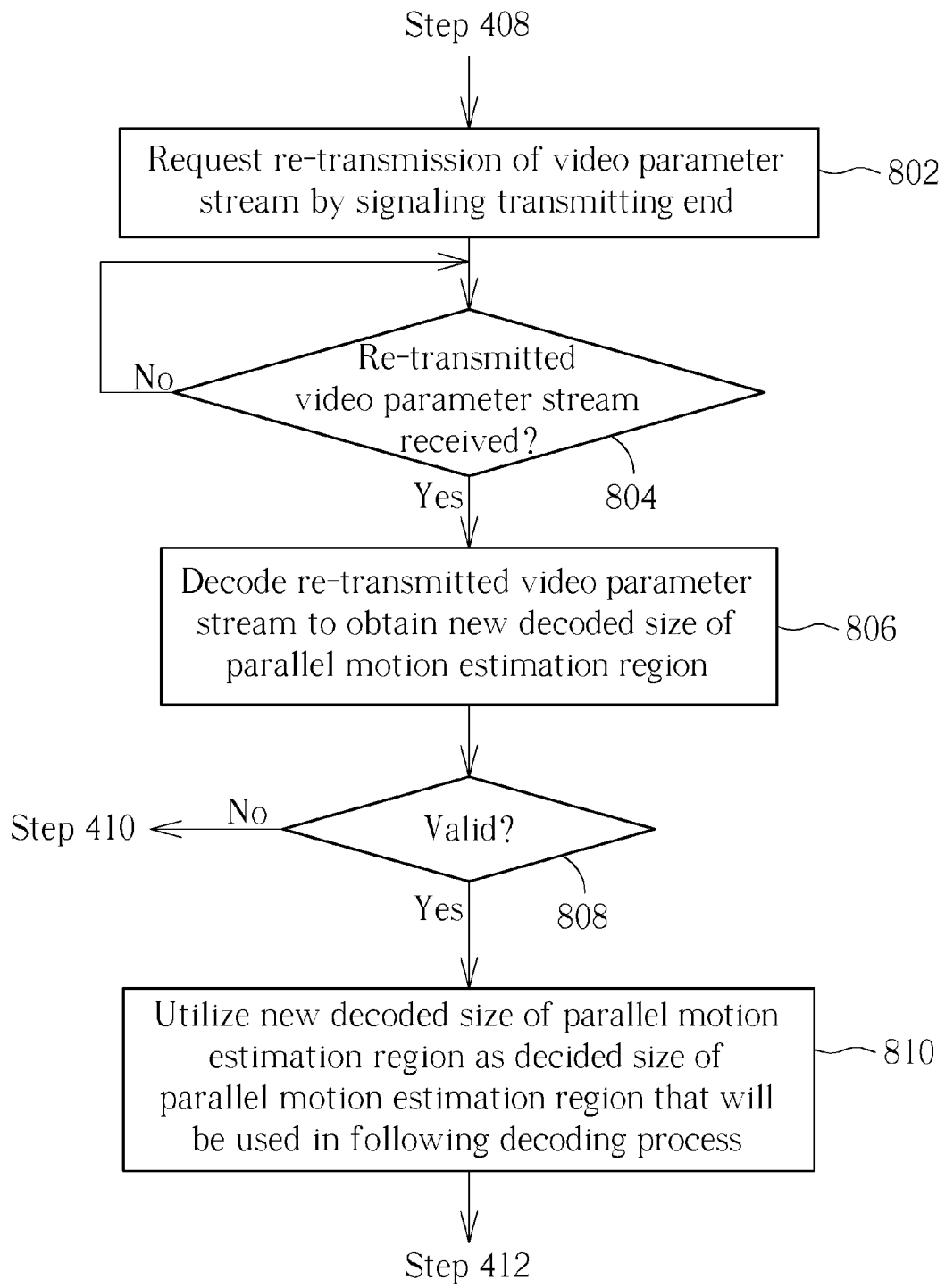
FIG. 8 is a flowchart illustrating a fourth error handling process according to an embodiment of the present invention.

Please refer to FIG. 8, which is a flowchart illustrating a fourth error handling process according to an embodiment of the present invention. Step 410 in FIG. 4 may be implemented using steps 802, 804, 806, 808 and 810 in FIG. 8. In accordance with the fourth error handling process, the video decoder 126 requests a re-transmission of the video parameter stream $BS_P$ by signaling the transmitting end, i.e., source device 102 (step 802). Next, the video decoder 126 waits for arrival of a re-transmitted video parameter stream $BS_P$ (step 804). After receiving the re-transmitted video parameter stream $BS_P$, the video decoder 126 decodes the re-transmitted video parameter stream $BS_P$ to obtain a new decoded size of a parallel motion estimation region (step 806). Next, the video decoder 126 checks validity of the new decoded size of the parallel motion estimation region according one of the above-mentioned validity checking rules, and accordingly generates a new checking result (step 808). When the new checking result indicates that the new decoded size of the parallel motion estimation region is not valid, the video decoder 126 enters error handling process 410. When the new checking result indicates that the new decoded size of the parallel motion estimation region is valid, the video decoder 126 utilizes the new decoded size of the parallel motion estimation region as the decided size of the parallel motion estimation region that will be used in the following decoding process (step 810).

The present invention provides more robust error handling between the video encoding and the video decoding, and is capable of preventing undesired error propagation when decoding video stream data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video encoding method, comprising:
   determining a size of a parallel motion estimation region according to encoding related information, wherein the encoding related information comprises at least one of an encoding type, information of an encoding application, and external system information;
   encoding a plurality of pixels by at least performing motion estimation based on the size of the parallel motion estimation region; and
   encoding the size of the parallel motion estimation region into a video parameter stream;
   wherein when the encoding related information includes the encoding type, the encoding type includes at least one of a reference type of a frame, a slice type of a slice, and a number of processing cores of a dedicated video encoder; when the reference type is used to determine the size of the parallel motion estimation region, the size of the parallel motion estimation region determined for the frame being a reference frame is smaller than the size of the parallel motion estimation region determined for the frame being a non-reference frame; when the slice type is used to determine the size of the parallel motion estimation region, the size of the parallel motion estimation region determined for the slice being a predicted (P) slice is smaller than the size of the parallel motion estimation region determined for the slice being a bi-directional predicted (B) slice; and when the number of processing cores of the dedicated video encoder is used to determine the size of the parallel motion estimation region, the size of the parallel motion estimation region is positively correlated to the number of processing cores of the dedicated video encoder.

2. The video encoding method of claim 1, wherein when the encoding related information includes the information of the encoding application, the information of the encoding application includes at least one of a performance mode, a latency mode, and an encoding scenario; and when the performance mode is used to determine the size of the parallel motion estimation region, the size of the parallel motion estimation region is negatively correlated to a performance degree indicated by the performance mode.

3. The video encoding method of claim 1, wherein when the encoding related information includes the external system information, the external system information includes at least one of a bandwidth status, a system power status, a system timing, and a number of processing cores of a general purpose processor; when the bandwidth status is used to determine the size of the parallel motion estimation region, the size of the parallel motion estimation region is negatively correlated to a system bandwidth indicated by the bandwidth status; when the system power status is used to determine the size of the parallel motion estimation region, the size of the parallel motion estimation region is negatively correlated to a remaining battery capacity indicated by the system power status; when the system timing is used to determine the size of the parallel motion estimation region, the size of the parallel motion estimation region is negatively correlated to a latency amount indicated by the system timing; and when the number of processing cores of the general purpose processor is used to determine the size of the parallel motion estimation region, the size of the parallel motion estimation region is positively correlated to the number of processing cores of the general purpose processor.

4. The video encoding method of claim 1, wherein the step of determining the size of the parallel motion estimation region comprises:
   adjusting the size of the parallel motion estimation region at a frame level.

5. The video encoding method of claim 1, wherein the step of determining the size of the parallel motion estimation region comprises:
   adjusting the size of the parallel motion estimation region at a sequence level.

6. A video decoding method, comprising:
   decoding a video parameter stream to obtain a decoded size of a parallel motion estimation region and a decoded size of a largest coding unit (LCU) and to further obtain a parity check result associated with the decoded size of the parallel motion estimation region;
   checking validity of the decoded size of the parallel motion estimation region, and accordingly generating a checking result, wherein the step of checking validity of the decoded size of the parallel motion estimation region comprises:
      comparing the decoded size of the parallel motion estimation region with the decoded size of the LCU to determine if the decoded size of the parallel motion estimation region contains at least one error bit, wherein when the decoded size of the parallel motion estimation region is larger than the decoded size of the LCU, the checking result indicates that the decoded size of the parallel motion estimation region is invalid due to having the at least one error bit included therein; and
      checking the parity check result;
   when the checking result indicates that the decoded size of the parallel motion estimation region fails to pass a parity check but falls within a range having the decoded size of the LCU as an upper bound, ignoring the checking result, and utilizing the decoded size of the parallel motion estimation region as a decided size of the parallel motion estimation region; and decoding a plurality of pixels by at least performing motion compensation based on the decided size of the parallel motion estimation region.

7. A video encoding apparatus, comprising:

an encoder parameter setting circuit, arranged to determine a size of a parallel motion estimation region according to encoding related information, wherein the encoding related information comprises at least one of an encoding type, information of an encoding application, and external system information; and a video encoder, arranged to encode a plurality of pixels by at least performing motion estimation based on the size of the parallel motion estimation region, and encode the size of the parallel motion estimation region into a video parameter stream;

wherein when the encoding related information includes the encoding type, the encoding type includes at least one of a reference type of a frame, a slice type of a slice, and a number of processing cores of a dedicated video encoder; when the reference type is used to determine the size of the parallel motion estimation region, the size of the parallel motion estimation region determined for the frame being a reference frame is smaller than the size of the parallel motion estimation region determined for the frame being a non-reference frame; when the slice type is used to determine the size of the parallel motion estimation region, the size of the parallel motion estimation region determined for the slice being a predicted (P) slice is smaller than the size of the parallel motion estimation region determined for the slice being a bi-directional predicted (B) slice; and when the number of processing cores of the dedicated video encoder is used to determine the size of the parallel motion estimation region, the size of the parallel motion estimation region is positively correlated to the number of processing cores of the dedicated video encoder.

8. A video decoding apparatus, comprising:

an input interface circuit, arranged to receive an encoded video bitstream including a video parameter stream; and a video decoder, arranged to decode the video parameter stream to obtain a decoded size of a parallel motion estimation region and a decoded size of a largest coding unit (LCU); obtain a parity check result associated with the decoded size of the parallel motion estimation region; check the parity check result and further check validity of the decoded size of the parallel motion estimation region by at least comparing the decoded size of the parallel motion estimation region with the decoded size of the LCU to determine if the decoded size of the parallel motion estimation region contains at least one error bit, and accordingly generate a checking result, wherein when the decoded size of the parallel motion estimation region is larger than the decoded size of the LCU, the checking result indicates that the decoded size of the parallel motion estimation region is invalid due to having the at least one error bit included therein; ignore the checking result and utilize the decoded size of the parallel motion estimation region as a decided size of the parallel motion estimation region when the checking result indicates that the decoded size of the parallel motion estimation region fails to pass a parity check but falls within a range having the decoded size of the LCU as an upper bound; and decode a plurality of pixels of the encoded video bitstream by at least performing motion compensation based on the decided size of the parallel motion estimation region.

* * * * *